Patented Dec. 18, 1945

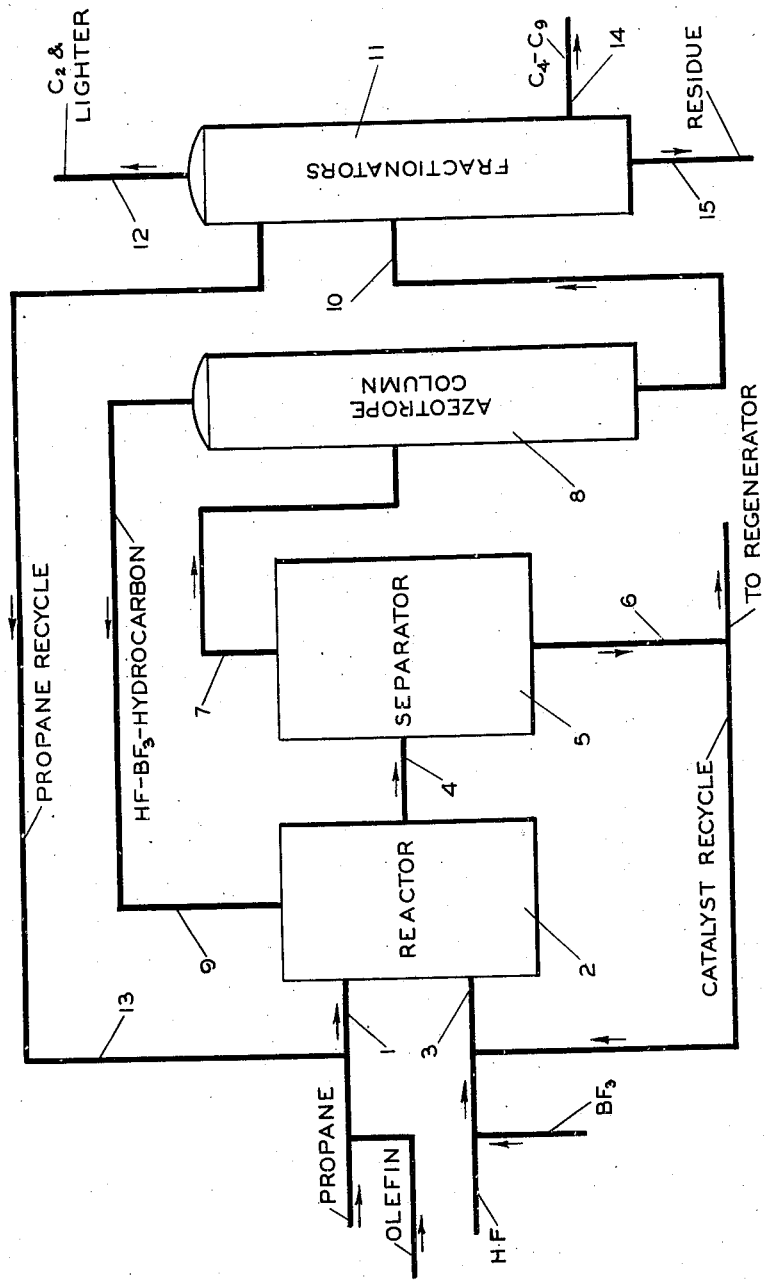

2,391,148

UNITED STATES PATENT OFFICE 2,391,148

PROCESS FOR REACTING PROPANE WITH OLEFINS

Frederick E. Frey, Bartlesville, Okla., assignor to Phillips Petroleum Company, a corporation of Delaware Application December 13, 1943, Serial No. 514,155

14 Claims. (Cl. 260—683.4)

This invention relates to a process of catalytically reacting propane with olefins or other alkylating agents. Usually the olefin or alkylating agent has a relatively low number of carbon atoms, ethylene being the preferred olefin.

The principal object of the present invention is to provide a process of reacting propane with olefins or other alkylating agents. Another object is to provide a process of reacting propane with ethylene. Another object is to convert propane and ethylene to butanes and heavier hydrocarbons.

This application is a continuation-in-part of my copending application Serial Number 467,954 filed December 5, 1942, which discloses a catalytic process for alkylating comparatively inert paraffin hydrocarbons, such as n-butane, with olefins.

The accompanying drawing portrays diagrammatically one arrangement of equipment suitable for carrying out the present invention.

I have now discovered that propane reacts with alkylating agents, especially aliphatic olefins, preferably ethylene, in the presence of hydrofluoric acid containing a minor proportion of boron fluoride, to produce butanes and heavier paraffin hydrocarbons.

Propane and an olefin, preferably ethylene, together with hydrofluoric acid containing 2 to 7 weight per cent of $BF_3$, are intimately contacted in a reactor by mechanical agitation, as by means of stirrers or jets. After a suitable contact time, the mixture in the reactor is withdrawn to a settler, in which the acid and hydrocarbon phases separate. The acid phase is withdrawn from the bottom and returned to the reactor. A portion of the acid phase may be passed to a regenerator for the recovery of HF and $BF_3$ from the spent catalyst. The hydrocarbon phase passes from the top of the settler to an azeotrope column which removes dissolved HF and $BF_3$ from the hydrocarbon phase and returns them, together with some light hydrocarbon, to the reactor. A hydrocarbon stream free from HF and $BF_3$ passes from the bottom of the azeotrope column to the fractionators, in which it is separated into the fractions: ethane and lighter, propane, other desired fractions, and residue. The propane is recycled to the reactor, and the heavier fractions are withdrawn as products of the process.

The temperature, the contact time, and the $BF_3$ content of the catalyst are interdependent and vary somewhat for different olefins, but they should be such that the olefin charged is substantially completely consumed. Ordinarily, temperatures in the range 100 to 250° F., contact times of 1 to 100 minutes, and boron fluoride contents of 2 to 7 weight per cent of the catalyst are satisfactory.

The pressure in the reactor may range from about 200 up to about 1000 p. s. i. or higher, depending upon the temperature and the particular mixture in the reactor. The pressure preferably should be sufficient to maintain the reaction mixture in the liquid phase.

The propane entering the reactor should be in sufficient molecular excess over the olefin that side reactions involving the olefins are minimized. Usually the mol ratio of propane to olefin in the reactor feed should be in the range of 2:1 to 10:1, or more. This mol ratio is maintained at such a figure and other conditions are such that in the preferred practice no olefin, or ethylene, appears in the reaction effluent.

A small amount of water, ranging from a trace to not more than the molecular equivalent of the boron fluoride in the catalyst, preferably should be present in the reactor, as it suppresses formation of an insoluble, heavy sludge. A convenient means of introducing about the optimum quantity of water is to saturate with water at least part of the hydrocarbon stream entering the reactor. The amount of water is preferably at least 0.1 per cent by weight of the catalyst.

Although all the reactions occurring in this process are not fully understood, it is believed that among these reactions is that of alkylation. However, the conditions necessary to induce alkylation of propane are so severe that the primary alkylate appears to undergo subsequent or secondary reactions producing butanes and heavier paraffins. It is probable that a more or less stationary state similar to thermodynamic equilibrium is approached among the various components of the product. It is advantageous in some cases to introduce as a modifier an aromatic hydrocarbon or a cycloparaffin in a minor proportion, such as up to about 10 weight per cent of the propane, or hydrogen in amount such as to have a partial pressure of from 50 up to 200 p. s. i., into the reactor in order to suppress disproportionation of the primary alkylate into homologs of higher and lower molecular weight. The process may be carried out in either a batchwise or continuous manner, the latter being ordinarily preferred in commercial operation. The design and arrangement of equipment for continuous operation is well within the skill of the art and forms per se no part of the present invention.

It is noteworthy that the reaction effluent contains no or only insignificant amounts of olefins or other unsaturated materials.

Example

A 365-cc. reactor equipped with a stirrer revolving at 1750 R. P. M. inside stationary blades was charged with water, propane, ethylene, hydrogen fluoride, and boron fluoride in the order given. The reactor was suspended in a heated oil bath to maintain a constant temperature. After the desired reaction time, the contents of the reactor were withdrawn into a cooled receiver, the acid phase was allowed to separate, and a sample of the hydrocarbon phase was obtained for examination. Data pertaining to the run are as follows:

Hydrocarbon charge composition, weight per cent:
| | |
|---|---|
| Propane | 91.9 |
| Ethylene | 8.1 |
| | 100.0 |

| | |
|---|---|
| Mol ratio propane to ethylene in charge | 7.4 |
| Water content of catalyst, weight percent | 0.1 |
| BF₃ content of catalyst, weight percent | 3.8 |
| Hydrocarbon/catalyst, approx. (vol.) | 0.6 |
| Pressure, p. s. i | 535 |
| Temperature, °F | 169 |
| Reaction time, min | 90 |

Conversion, weight percent of component charged:
| | |
|---|---|
| Propane | 13.6 |
| Ethylene | 100.0 |
| Propane converted/ethylene converted (mol) | 0.99 |

Product composition, weight per cent:
| | |
|---|---|
| Ethane | 0.95 |
| Propane | 79.39 |
| Butanes | 11.94 |
| Pentanes and heavier | 7.72 |
| Total | 100.00 |

Substantially equimolecular amounts of propane and ethylene reacted, yielding an almost equivalent amount of butanes and heavier paraffins and only a relatively small amount of a light hydrocarbon fraction (ethane).

In the drawing a feed of propane and alkylating agent, usually a lower aliphatic olefin (by which I mean an olefin having from 2 to 5 carbon atoms) and most preferably ethylene enters reactor 2 via line 1 while catalyst enters via line 3. The reaction effluent passes via line 4 to separator 5 where the two layers are allowed to form and are separately withdrawn, the acid layer via line 6 whence it is split into two portions, one being passed to regeneration and the other being recycled. The hydrocarbon layer passes via line 7 to fractional distillation column 8 whence the overhead is recycled via line 9 while the kettle product passes via line 10 to a fractional system indicated by 11 and from which C₂ hydrocarbons and lighter are vented via line 12, a propane fraction is recycled via line 13, and one or more fractions of butanes and heavier paraffins are removed at a lower point or points, as indicated by a fraction of C₄ to C₅ paraffins taken off via line 14. A residue of materials higher-boiling than the motor fuel or aviation range is taken off via line 15.

It will be understood that the invention is not to be taken as limited by the foregoing specific details which are by way of illustration only but only as limited by the terms or the spirit of the appended claims.

Many advantages of the present invention will be apparent to those skilled in the art. Among them is that a relatively cheap material now largely wasted or burned as fuel, namely propane, is converted to valuable hydrocarbons, namely butanes and heavier paraffins in great demand for the manufacture of motor and aviation fuels and as starting materials for the preparation of other hydrocarbons and chemicals such as butenes, butadiene, pentenes, pentadienes, alkylate, etc.

I claim:

1. The process which comprises reacting propane with an alkylating agent in the presence of a catalyst consisting of hydrofluoric acid containing a minor proportion of boron fluoride.

2. The process which comprises reacting propane with a lower aliphatic olefin in the presence of a catalyst consisting of hydrofluoric acid containing a minor proportion of boron fluoride.

3. The process which comprises reacting propane with ethylene in the presence of a catalyst consisting of hydrofluoric acid containing a minor proportion of boron fluoride.

4. The process which comprises reacting propane with ethylene in the presence of a catalyst consisting of hydrofluoric acid containing from 2 to 7 weight per cent of boron fluoride.

5. The process which comprises reacting propane with ethylene in the presence of a catalyst consisting of hydrofluoric acid containing from 2 to 7 per cent of boron fluoride, and maintaining a mol ratio of propane to ethylene in the reaction zone of from 2:1 to 10:1.

6. The process which comprises reacting propane with an alkylating agent in the presence of a catalyst consisting of hydrofluoric acid and boron fluoride at a temperature ranging from 100 to 250° F. and under a pressure ranging from 200 to 1000 pounds per square inch and such as to maintain the reaction mixture in liquid phase.

7. The process which comprises reacting propane with ethylene in the presence of a catalyst consisting of hydrofluoric acid and boron fluoride at a temperature ranging from 100 to 250° F., under pressure such as to maintain the reaction mixture in the liquid phase and for a contact time of 1 to 100 minutes.

8. The process which comprises reacting propane with ethylene in the presence of a catalyst consisting of hydrofluoric acid and boron fluoride, the mol ratio of propane to ethylene being at least 2:1 and all of the ethylene being consumed in the reaction.

9. The process which comprises reacting propane with ethylene in the presence of a catalyst consisting of hydrogen fluoride, boron fluoride in amount equal to from 2 to 7 weight per cent of the catalyst and water in amount ranging from a trace to the molecular equivalent of the boron fluoride.

10. The process which comprises reacting propane with ethylene in the presence of a catalyst consisting of hydrogen fluoride, boron fluoride in amount equal to from 2 to 7 weight per cent of the catalyst and water in amount ranging from 0.1 weight per cent of the catalyst up to that amount which is molecularly equivalent to the boron fluoride.

11. The process which comprises reacting propane with ethylene in the presence of a catalyst consisting of hydrofluoric acid containing from 2 to 7 weight per cent of boron fluoride and a small amount of water ranging from a trace to not more than the molecular equivalent of said boron fluoride, maintaining a mol ratio of propane to ethylene in the reaction zone of from 2:1 to 10:1, carrying out said reaction at a temperature ranging from 100 to 250° F., at a pressure sufficient to maintain the reaction mixture in the liquid phase and for a contact time of from 1 to 100 minutes, withdrawing the reaction mixture from the reaction zone and separating same into an acid phase and a hydrocarbon phase, withdrawing said hydrocarbon phase and fractionally distilling same to remove overhead the dissolved hydrogen fluoride and boron fluoride, recycling the hydrogen fluoride and boron fluoride so recovered to the reaction step, fractionally distilling the hydrocarbon residue from said distilling step and free from hydrogen fluoride and boron fluoride to separate same into at least one fraction of ethane and lighter, a fraction of propane, and at least one fraction containing butane and heavier paraffins as products of the process, and recycling said propane fraction to the reaction step.

12. The process which comprises reacting propane with ethylene by means of a catalyst consisting of hydrofluoric acid and boron fluoride in the presence of a cyclic hydrocarbon selected from the group consisting of aromatic hydrocarbons and cycloparaffins in amount ranging up to 10 weight per cent of the propane, said cyclic hydrocarbon suppressing disproportionation of the primary alkylate produced by alkylation of the propane by the ethylene.

13. The process which comprises reacting propane with ethylene by means of a catalyst consisting of hydrofluoric acid and boron fluoride at a total pressure ranging from 200 to 1000 pounds per square inch in the presence of hydrogen of a partial pressure ranging from 50 to 200 pounds per square inch, said hydrogen suppressing disproportionation of the primary alkylate produced by alkylation of the propane by the ethylene.

14. The process of effecting reaction of propane with ethylene to form butanes and pentanes which comprises forming a hydrocarbon charge consisting of propane and ethylene in a mol ratio of approximately 7.4 to 1, intimately contacting said charge with a catalyst consisting of hydrogen fluoride containing about 3.8 weight per cent of boron trifluoride and about 0.1 weight per cent of water, the volume ratio of hydrocarbon to catalyst being approximately 0.6, maintaining the mixture at a pressure of about 535 pounds per square inch and a temperature of about 169° F. for a reaction time of about 90 minutes, withdrawing the resulting reaction mixture and allowing same to separate into an acid phase and a hydrocarbon phase, and recovering butanes and pentanes from said hydrocarbon phase.

FREDERICK E. FREY.